United States Patent
Lieber et al.

(10) Patent No.: US 10,370,472 B2
(45) Date of Patent: Aug. 6, 2019

(54) ETHYLENE COPOLYMERISATES HAVING IMPROVED LOW-TEMPERATURE PROPERTIES AND GOOD OIL RESISTANCE, VULCANIZABLE MIXTURES MADE THEREFROM AND VULCANIZATES

(71) Applicant: ARLANXEO DEUTSCHLAND GMBH, Dormagen (DE)

(72) Inventors: Susanna Lieber, Kaiserslautern (DE); Olaf Isenberg-Schulz, Langenfeld (DE); Ulrich Frenzel, Dormagen (DE); Rainer Kalkofen, Leverkusen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 86 days.

(21) Appl. No.: 15/568,837

(22) PCT Filed: Apr. 19, 2016

(86) PCT No.: PCT/EP2016/058657
§ 371 (c)(1),
(2) Date: Oct. 24, 2017

(87) PCT Pub. No.: WO2016/173890
PCT Pub. Date: Nov. 3, 2016

(65) Prior Publication Data
US 2018/0112020 A1 Apr. 26, 2018

(30) Foreign Application Priority Data
Apr. 30, 2015 (EP) .................................... 15165823

(51) Int. Cl.
*C08F 210/02* (2006.01)
*C08F 218/08* (2006.01)
*C08F 220/28* (2006.01)

(52) U.S. Cl.
CPC .......... *C08F 218/08* (2013.01); *C08F 210/02* (2013.01); *C08F 220/28* (2013.01)

(58) Field of Classification Search
CPC ................. C08F 210/02; C08F 218/08; C08F 2220/285; C08F 220/28
See application file for complete search history.

(56) References Cited

U.S. PATENT DOCUMENTS

| 4,323,666 A * | 4/1982 | Shirinian | C08F 210/02 |
| | | | 525/262 |
| 2015/0133577 A1* | 5/2015 | Han | C08F 218/08 |
| | | | 523/102 |

* cited by examiner

*Primary Examiner* — Vu A Nguyen
(74) *Attorney, Agent, or Firm* — Norris McLaughlin P.A.

(57) ABSTRACT

The present invention relates to copolymers of ethylene, vinyl esters of an alkyl carboxylic acid and other specific unsaturated carboxylic esters which have lower glass transition temperature than copolymers of ethylene and vinyl esters of an alkyl carboxylic acid, and also to production and use of these, to vulcanizable mixtures comprising the copolymers of the invention, to crosslinking of these and to vulcanizates and moldings obtainable therefrom.

18 Claims, No Drawings

ETHYLENE COPOLYMERISATES HAVING IMPROVED LOW-TEMPERATURE PROPERTIES AND GOOD OIL RESISTANCE, VULCANIZABLE MIXTURES MADE THEREFROM AND VULCANIZATES

Copolymers of ethylene and vinyl esters of an alkyl carboxylic acid, in particular ethylene-vinyl acetate copolymers with vinyl acetate (VA) content above 35% by weight, are rubbers produced on an industrial scale from which it is possible, e.g. via free-radical crosslinking or crosslinking by means of electromagnetic radiation, to produce vulcanizates which in particular feature good resistance to oils and other fluids, and also excellent ageing resistance.

However, the ethylene-vinyl acetate rubbers currently marketed do not adequately comply with the requirement, which is constantly increasing in importance, of good low-temperature flexibility combined with a low oil-swelling factor, because improved oil resistance has hitherto been possible only with simultaneous impairment of low-temperature flexibility. Ethylene-vinyl acetate rubbers typically exhibit a relationship between VA content, glass transition temperature and oil-swelling factor: as VA content increases, i.e. polarity increases, the oil-swelling factor improves, but at the same time glass transition temperature rises sharply and vice versa. Attempts to use incorporation of various additional comonomers to reduce glass transition temperature with constant oil-swelling factor or to reduce the oil-swelling factor at constant glass transition temperature have not hitherto led to adequate success.

The literature describes various approaches to improvement of low-temperature properties of ethylene-vinyl acetate copolymers:

Use of plasticizers to improve low-temperature properties of EVM vulcanizates is conventional and well known (see by way of example Bayer "Handbuch für die Gummi-Industrie" [Rubber industry handbook] 2nd Edition, pp. 140 ff.). However, in particular the plasticizers most effective for improving low-temperature properties, e.g. dioctyl adipate (DOA), dioctyl sebacate (DOS) and citric esters, e.g. tri(2-ethylhexyl) acetylcitrate and tributyl acetylcitrate, are relatively volatile and therefore often lead to problems with heat-ageing of the vulcanizates.

The quantity of the plasticizer that can be added is moreover subject to limitation because otherwise it becomes impossible to achieve the required hardness and/or other vulcanizate properties such as elongation at break and/or tensile strength. Problems can moreover arise due to exudation of the plasticizer, migration of the plasticizer out of the rubber, or plasticizer extraction. Rather than use of plasticizer alone, it is preferable to reduce the glass transition temperature of the rubber the mixture developer firstly obtains greater flexibility in the selection of the plasticizer and the quantity added thereof, or can optionally actually entirely omit any addition of the same, without any need to accept sacrifices in low-temperature properties of the rubber or in heat-ageing. Secondly, a combination of suitable plasticizers with the improved rubber with lower glass transition temperature can provide an additional downwards extension of the usable temperature range of the rubber.

EP0374866A1 describes inter alia the production of ethylene-vinyl acetate copolymers with various termonomers, for example glycidyl methacrylate, methyl acrylate, acrylic acid or 3-methoxybutyl acrylate with allegedly increased resistance to organic solvents, fuels and oils, and high flexibility even at low temperatures. There is a complete absence of measured data providing evidence of these properties. In the case of 3-methoxybutyl acrylate it is moreover completely unclear whether the termonomer used is actually reacted during the polymerization and incorporated into the polymer, because no analysis data of any kind are provided for the resultant polymer. The polymers are produced by way of a solution polymerization process carried out continuously in a cascade, where the entire quantity of vinyl acetate, of ethylene and of the respective termonomer is already present in the reaction solution when the polymerization reaction begins. There is no disclosure of subsequent addition of one or more components.

J.-F. Lutz et al. describe, for example in J. Polym. Sci., Polym. Chem. 2008, 46, 3459 and Macromolecules 2006, 39, 893, the polymerization of polyethylene glycol methacrylates for synthesis of polymers with increased, to some extent temperature-dependent water-solubility. There is no description of terpolymers of the polyethylene glycol methacrylates with ethylene and with vinyl esters of an alkyl carboxylic acid.

JP 2014019805A discloses the reaction of a partially hydrolysed ethylene-vinyl acetate copolymer with a polyethylene glycol monoethyl ether in the presence of diisocyanates. The product is used to render plastics antistatic.

The object of the present invention consisted in the provision of copolymers comprising ethylene and vinyl esters of an alkyl carboxylic acid which avoid the disadvantages of the prior art and have good low-temperature properties combined with high oil resistance and a low water-swelling factor, and also good ageing properties.

The said object is achieved via ethylene copolymers comprising
  i) from 10 to 69% by weight, preferably from 15 to 59% by weight, of copolymerized ethylene,
  ii) from 30 to 84% by weight, preferably from 35 to 80% by weight, of copolymerized units of at least one vinyl ester of an alkyl carboxylic acid and
  iii) from 1 to 50% by weight of repeating units derived from at least one monomer of the general formula (I)

$$CH_2=C(R^1)(COO(R^2O)_nR^3) \qquad (I)$$

in which
  $R^1$ is hydrogen or methyl,
  $R^2$ is respectively mutually independently a linear or branched $C_2$ to $C_6$-alkylene group,
  $R^3$ is hydrogen, unsubstituted phenyl or phenyl having one or more $C_1$-$C_3$ alkyl substituents, a linear or branched $C_1$-$C_8$ alkyl group or $—C(=O)R^4$,
  $R^4$ is hydrogen or a linear or branched $C_1$-$C_8$ alkyl group and
  n is a number from 2 to 30,
  where the quantities are based in each case on the entirety of the monomers i) to iii).

The term "copolymers" is understood by the person skilled in the art to mean polymers composed of two or more different types of monomer units.

The general formula (I), $CH_2=C(R^1)(COO(R^2O)_nR^3)$, can also be written as the following structural formula:

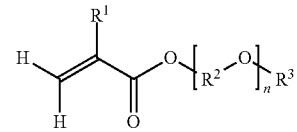

Suitable vinyl esters of an alkyl carboxylic acid are preferably those deriving from an alkyl carboxylic acid group having from 2 to 13 C atoms and also from a vinyl alcohol group having from 2 to 5 C atoms, in particular those selected from the group comprising vinyl acetate, vinyl propionate, vinyl butyrate, vinyl laurate, 1-methylvinyl acetate and vinyl esters of α-branched monocarboxylic acids having from 5 to 13 C atoms (by way of example vinyl pivalate, VeoVa9™, VeoVa10™ and VeoVa11™ from Hexion), particularly preferably vinyl acetate and vinyl propionate and most preferably vinyl acetate. These monomers can be used individually or in combination, preference being given here to individual use.

The monomers of the general formula (I) have moieties $R^2$ which are selected mutually independently from the group comprising ethane-1,2-diyl, propane-1,3-diyl, propane-1,2-diyl, butane-1,4-diyl, butane-1,3-diyl, pentane-1,3-diyl, pentane-1,4-diyl, pentane-1,5-diyl, and 2-methylbutane-1,4-diyl, preferably ethane-1,2-diyl, propane-1,3-diyl, propane-1,2-diyl, and butane-1,4-diyl, particularly preferably ethane-1,2-diyl and propane-1,2-diyl.

The expression "mutually independently" here is intended to make clear that various moieties $R^2$ can be present in a molecule. The resultant different $R^2O$ units can as desired have random, alternating or blockwise arrangement in the polyether chain of the molecule here.

The moieties $R^3$ of the monomers of the general formula (I) are selected from the group consisting of H, $CH_3$, $CH_2CH_3$, $CH_2CH_2CH_3$, $CH_2CH_2CH_2CH_3$, CHO, $COCH_3$, $COCH_2CH_3$, $COCH_2CH_2CH_3$ and $COCH_2CH_2CH_2CH_3$, preferably H, $CH_3$, $CH_2CH_3$, and $COCH_3$ and particularly preferably $CH_3$, $CH_2CH_3$ and $COCH_3$. Monomers used of the general formula (I) can comprise mixtures of a number of different monomers of the general formula (I) which differ by way of example in the moieties $R^1$, $R^2$ and/or $R^3$ or in the number of repeating units "n".

Examples of monomers of the general formula (I) are polyethylene glycol acrylate, polyethylene glycol methacrylate, polypropylene glycol acrylate, polypropylene glycol methacrylate, mixed poly(ethylene glycol propylene glycol) acrylate or poly(ethylene glycol propylene glycol) methacrylate and poly(THF) acrylate and poly(THF) methacrylate. Particular preference is given to methoxy- or ethoxy-terminated polyethylene glycol acrylate and, respectively, methacrylate and to methoxy- or ethoxy-terminated polypropylene glycol acrylate and, respectively, methacrylate having from 2 to 25 repeating ethylene glycol or propylene glycol units, very particularly preferably having from 2 to 20 repeating ethylene glycol or propylene glycol units.

Processes for the production of monomers of the general formula (I) are familiar to the person skilled in the art and are described in the relevant literature. Many such compounds are moreover obtainable commercially.

The content of repeating units derived from monomers of the general formula (I) is preferably from 2 to 40% by weight, particularly preferably from 4 to 25% by weight and most preferably from 6 to 20% by weight, based in each case on the entirety of the monomers i) to iii).

The ethylene copolymers of the invention can moreover also comprise one or more other copolymerized monomers (iv), i.e. copolymers not covered by the above definition of the monomers numbered i), ii) and iii), and specifically in a total quantity of less than 25% by weight, preferably less than 20% by weight, more preferably less than 15% by weight, still more preferably less than 10% by weight, particularly preferably less than 5% by weight and very particularly preferably less than 1% by weight, based in each case on the total quantity of the monomers numbered i) to (iv).

These other monomers (iv) are typically selected from the group comprising $C_1$-$C_8$-alkyl acrylates, $C_1$-$C_8$-alkyl methacrylates, acrylates containing epoxy groups, methacrylates containing epoxy groups, monoalkyl maleates, monoalkyl fumarates, vinyl ketones, vinylaromatic compounds, conjugated dienes, α-monoolefins, vinyl monomers having a hydroxy group, chlorovinyl acetate, vinylidene fluoride, hexafluoropropene, vinylidene chloride, tetrafluoroethylene, tetrachloroethylene, vinyl chloride, unsaturated amide monomers and carbon monoxide, preferably from methyl acrylate, ethyl acrylate, propyl acrylate, n-butyl acrylate, 2-ethylhexyl acrylate, n-octyl acrylate, glycidyl methacrylate; divinyl adipate, methyl vinyl ketone, ethyl vinyl ketone, styrene, α-methylstyrene, vinyltoluene, butadiene, isoprene, propylene, 1-butene, β-hydroxyethyl acrylate, 4-hydroxybutyl acrylate, 3-cyanoethyl acrylate, acrylamide, N-methylmethacrylamide and carbon monoxide, very particularly preferably from glycidyl methacrylate and carbon monoxide.

In the most preferred embodiment the ethylene copolymers of the invention are copolymers of ethylene, vinyl acetate and polyalkylene-glycol-containing (meth)acrylates having from 2 to 20 repeating ethylene glycol and/or propylene glycol units.

The monomers in the ethylene copolymers of the invention have random, alternating or blockwise arrangement, preferably random arrangement.

In one preferred embodiment the ethylene copolymers of the invention are obtainable via a process in which after the polymerization reaction has been initiated monomers of the general formula (I) are added to the reaction mixture.

The Mooney viscosities (ML (1+4) 100° C.) of the ethylene copolymers of the invention are usually a ≥5 Mooney units (MU), preferably a ≥10 Mooney units, particularly preferably a ≥15 Mooney units. The Mooney viscosity (ML (1+4) 100° C.) values are determined by using a shearing disc viscometer in accordance with ISO 289 (ISO 289-1:2014-02) at 100° C.

The polydispersity PDI=$M_w/M_n$ (where $M_w$ is the weight average and $M_n$ is the number average of the molecular weight) of the ethylene copolymers of the invention is typically in the range from 2 to 10, preferably in the range from 2.5 to 6.

The weight-average molar mass Mw of the ethylene copolymers of the invention is usually in the range from 30 kg/mol to 500 kg/mol, preferably from 40 kg/mol to 450 kg/mol and very particularly preferably from 50 kg/mol to 340 kg/mol.

The glass transition temperatures of the ethylene copolymers of the invention are typically in the range from +10° C. to −50° C., preferably in the range from 0° C. to −45° C. and particularly preferably in the range from −5° C. to −40° C. (measured by means of DSC using a heating rate of 20 K/min).

The invention further provides a process for the production of the ethylene copolymers of the invention in which ethylene, vinyl esters of an alkyl carboxylic acid, monomers of the general formula (I) and optionally one or more other monomers (iv) are subjected to free-radical polymerization.

In one preferred embodiment the process for the production of the ethylene copolymers of the invention is carried out by adding monomers of the general formula (I) to the reaction mixture after the polymerization reaction has been initiated. It is possible that when the polymerization reaction begins the reaction mixture already comprises part of the total quantity used of monomers of the general formula (I), or that all of the monomers of the general formula (I) are added only after the polymerization reaction has been initiated. When the polymerization reaction begins the reaction solution typically comprises up to 50%, preferably up to 33%, particularly preferably up to 25%, very particularly preferably up to 20%, and most preferably from 1 to 15%, of monomers of the general formula (I), based in each case on the total quantity of monomers of the general formula (I).

The process here is typically carried out as batch process, e.g. in a stirred tank, or as continuous process, e.g. In a tank cascade or in a tubular reactor. In the case of a batch process the meaning of addition of monomers of the general formula (I) after it has been initiated is that after the reaction has been initiated monomers of the general formula (I) are added in one or more, preferably more than one, portions, or added continuously, to the reaction mixture, whereas in the case of a continuous process the monomers of the general formula (I) are added at at least one, preferably more than one, location to the reaction mixture, said location(s) being downstream of the point where the reaction begins.

In one preferred embodiment, when the polymerization reaction begins the reaction solution comprises:
  a) from 1 to 69% by weight, preferably from 15 to 59% by weight, of ethylene,
  b) from 30 to 84% by weight, preferably from 40 to 80% by weight, of vinyl acetate and
  c) from 0 to 30% by weight of monomer of the general formula (I), where $R^1$ is hydrogen or methyl, $R^2$ is respectively mutually independently a linear or branched $C_2$-$C_4$-alkylene group, $R^3$ is hydrogen, a linear or branched $C_1$-$C_8$ alkyl group or —C(=O)$R^4$, $R^4$ is hydrogen or a linear or branched $C_1$-$C_8$ alkyl group and n is a number from 2 to 30,
    based in each case on the entirety of components a)+b)+c).

It is preferable that the reaction solution moreover comprises from 20 to 60% by weight (based on the total mass of the reaction solution) of a polar organic solvent, preferably of an alcoholic solvent having from 1 to 4 C atoms, particularly preferably tert-butanol.

The polymerization reaction here can be initiated by a polymerization initiator which decomposes by a free-radical route, the proportion of which, based on the entirety of components a)+b), is usually from 0.001 to 1.5% by weight, examples being compounds containing peroxide groups and compounds containing azo groups, or can be initiated via exposure to electromagnetic radiation.

If monomers of the general formula (I) are added after the polymerization reaction has been initiated, these monomers can be added either undiluted or else in the form of mixture with the vinyl ester monomer and/or with the reaction solvent used. The last-mentioned mixture is also termed functionalization solution hereinafter.

Preference is given to addition in the form of a mixture of
  d) from 0 to 95% by weight of vinyl ester of an alkyl carboxylic acid and
  e) from 5 to 100% by weight of monomers of the general formula (I)
  based in each case on the entirety of components d)+e), and also
  from 0 to 60% by weight of a polar organic solvent having from 1 to 4 C atoms, particularly preferably tert-butanol, based on the entirety of components d)+e), and also of the polar organic solvent, where at least vinyl ester of an alkyl carboxylic acid or polar organic solvent is present in the mixture.

Addition of a functionalization solution comprising vinyl ester of an alkyl carboxylic acid has the advantage over separate addition or addition of undiluted material that the mixture is liquid over a wide temperature range and continues to be readily amenable to pumping, and therefore that there is generally no need to heat the storage containers and lines.

In the case of batch polymerization reactions it is preferable that the functionalization solution is added continuously.

It is particularly preferable to carry out the polymerization reaction continuously in a reactor cascade. The functionalization solution is typically added here at a reactor temperature in the range from 35° C. to 110° C. in at least one, preferably in more than one, reactor following the reactor in which the polymerization reaction is initiated. If the process is carried out in a tubular reactor, the material is added at at least one point downstream of the point at which the reaction is initiated.

Inventive addition of the functionalization solution leads to greater chemical uniformity of the ethylene copolymers of the invention and thus to better properties, e.g. an even lower glass transition temperature.

It is preferable that the solution-polymerization process for the production of the ethylene copolymers of the invention is carried out at temperatures >35° C., particularly >40° C., very particularly at >45° C. The polymerization reaction usually takes place at pressures of from 150 to 500 bar, preferably from 250 to 450 bar. The average residence time is typically in the range from 0.5 to 12 hours.

The following are preferably used as polymerization initiator: peroxydicarbonates, peroxyesters, hydroperoxides, peroxides or azo compounds such as 2,2'-azobis-(2,4-dimethylvaleronitrile) (ADVN), 2,2'-azosobutyronitrile (AIBN), 2,2'-azobis(4-methoxy-2,4-dimethylvaleronitrile), 2,2'-azobis(2-methylbutyronitrile), 1,1'-azobis(cyclohexane-1-carbonitrile), dimethyl 2,2'-azobis(2-methylpropionate), 22'-azobis[N-(2-propenyl)-2-methylpropionamide], 1-[(1-cyano-1-methylethyl)azo]formamide, 2,2-azobis(N-butyl-2-methylpropionamide), 2,2'-azobis(N-cyclohexyl-2-methylpropionamide), 2,2'-azobis[2-(2-imidazolin-2-yl)propane]dihydrochloride, 2,2'-azobis[2-(2-imidazolin-2-yl)propane]disulphate dihydrate, 2,2'-azobis(2-methylpropionamidine) dihydrochloride, 2,2-azobis[N-(2-carboxyethyl)-2-methylpropionamidine]hydrate, 2,2-azobis(2-[1-(2-hydroxyethyl)-2-imidazolin-2-yl]propane) dihydrochloride, 2,2-azobis[2-(2-imidazolin-2-yl)propane], 2,2'-azobis(1-imino-1-pyrrolidino-2-ethylpropane) dihydrochloride, 2,2'-azobis{2-methyl-N-(1,1-bis(hydroxymethyl)-2-hydroxyethylproponamide}, 2,2'-azobis[2-methyl-N-(2-hydroxyethyl)propion-amide], acetylcyclohexane sulphonyl peroxide, bis(4-tert-butylcyclohexyl) peroxydicarbonate and bis(2-ethylhexyl) peroxydicarbonate. The following are particularly preferably used as polymerization initiator: 2,2'-azobis(2,4-dimethylvaleronitrile) (ADVN), 2,2'-azoisobutyronitrile (AIBN), 2,2'-azobis(4-methoxy-2,4-dimethylvaleronitrile) or di(4-tert-butylcyclohexyl) peroxydicarbonate.

The present invention also provides vulcanizable mixtures comprising ethylene copolymers of the invention with one or more crosslinking agents and/or other additives. Crosslinking agents are not required by way of example for compositions vulcanized by irradiation crosslinking.

Examples of crosslinking agents that can be used are peroxidic crosslinking agents such as bis(2,4-dichlorobenzyl) peroxide, dibenzoyl peroxide, bis(4-chlorobenzoyl) peroxide, 1,1-bis(tert-butylperoxy)-3,3,5-trimethylcyclohexane, tert-butyl perbenzoate, 2,2-bis(tert-butyl-peroxy) butene, 4,4-di-tert-butylperoxynonylvalerate, dicumyl peroxide, 2,5-dimethyl-2,5-di(tert-butylperoxy)hexane, tert-butylcumyl peroxide, 1,3-bis(tert-butylperoxyisopropyl)-benzene, di-tert-butyl peroxide and 2,5-dimethyl-2,5-di(tert-butylperoxy)-3-hexyne.

The total quantity of the crosslinking agent(s) is usually in the range from 0.5 to 15 phr, preferably in the range from 1 to 10 phr and particularly preferably in the range from 1.5 to 6 phr, based on the ethylene copolymers of the invention. It is preferably possible here to use supported peroxides, and in that case the stated quantities must be corrected to reflect the quantity of the support.

It can be advantageous to use, alongside these peroxidic crosslinking agents, other additions, known as co-agents, which can be used to increase crosslinking yield: examples of compounds suitable for this purpose are triallyl isocyanurate, triallyl cyanurate, trimethylolpropane trimethacrylate, triallyl trimellitate, ethylene glycol dimethacrylate, butanediol dimethacrylate, trimethylolpropane triacrylate, zinc diacrylate, zinc dimethacrylate, 1,2-polybutadiene and N,N'-m-phenylenedimaleimide. The total quantity of the co-agent(s) is usually in the range from 0.2 to 10 phr, preferably from 0.4 to 4 phr, particularly preferably from 0.6 to 2 phr, based on the ethylene copolymers of the invention. Here again it is possible to use supported compounds, and in that case the stated quantities must be corrected to reflect the mass of the support. In the case of ethylene copolymers of the invention comprising epoxy functionalities of the type that can by way of example be introduced through use of glycidyl methacrylate as additional monomer, it is also possible to carry out crosslinking via addition of a polyacid or of an anhydride of a polyacid or of diamines and of suitable accelerators, instead of peroxidic crosslinking. An example of a polyacid that can be used is glutaric acid or adipic acid, and an example of an accelerator that can be used is tetrabutylammonium bromide.

A possibility that is alternative to these types of crosslinking is, as mentioned, crosslinking of the copolymers of the invention with the aid of high-energy radiation, e.g. beta- or gamma-radiation, and again in that case it is possible to use the abovementioned co-agents to improve crosslinking yield.

Vulcanizable mixtures of this type can also optionally comprise one or more additives and fibrous materials that the person skilled in the art commonly uses for rubbers. These comprise by way of example fillers, plasticizers, ageing retarders, light stabilizers, processing aids, tackifiers, blowing agents, dyes, pigments, waxes, resins, organic acids and/or salts thereof, vulcanization retarders, metal oxides, fibres, and also filer activators and other additives known in the rubber industry (see by way of example Ullmann's Encyclopedia of Industrial Chemistry, VCH Verlagsgesellschaft mbH, D-69451 Weinheim, 1993, Vol. A 23 "Chemicals and Additives", pp. 366-417 or Bayer AG "Manual for the Rubber Industry" 2nd fully revised edition, 1993).

The vulcanizable compositions of the invention can thus preferably also comprise one or more filers, e.g. carbon black, talc powder, silica, calcium carbonate and (calcined) kaolin, (calcined) aluminium silicates, particularly preferably carbon black, silica, calcined aluminium silicates, and/ or calcined kaolin.

The vulcanizable compositions of the invention can also comprise one or more plasticizers, e.g. dioctyl sebacate, dioctyl adipate, phosphoric esters, TOTM, etc.

Examples of filler activators that can be used are organic silanes, for example vinyltrimethyloxysilane, vinyldimethoxymethylsane, vinyltriethoxysilane, vinyltris(2-methoxy-ethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltrimethoxysilane, hexadecyltrimethoxysilane, (octadecyl)methyldimethoxysilane and silanes containing epoxy groups, for example 3-glycidoxypropyltrimethoxysilane or 3-glycidoxypropyltrimethoxysilane. Examples of other filler activators are surface-active substances such as triethanolamine, trimethylolpropane, hexanetriol and polyethylene glycols with molar masses from 74 to 10000 g/mol. The quantity of filler modifiers is usually from 0 to 10 parts by weight, based on 100 parts by weight of the ethylene copolymer of the invention.

Antioxidants that can be added to the vulcanizable compositions are any of those known to the person skilled in the art, quantities of these usually used being from 0 to 5 parts by weight, preferably from 0.5 to 3 parts by weight, based on 100 parts by weight of the ethylene copolymers of the invention. It is preferable to use CDPA and TMQ.

Other ageing retarders that can be used are add scavengers, e.g. calcium oxide, magnesium oxide, magnesium carbonate, zinc oxide, zinc carbonate, lead oxide, sodium carbonate or lithium carbonate, the quantities added being up to 10 phr, preferably up to 5 phr. It is very particularly preferable to use calcium oxide, magnesium oxide or lithium carbonate, the quantities added being up to 5 phr. It is also possible to use carbodiimides, in particular polymeric carbodiimides, e.g. Stabaxol® P, in quantities up to 10 phr, preferably up to 5 phr, particularly preferably up to 2 phr. It is likewise possible and preferable to use a combination of a variety of these acid scavengers.

Examples of processing aids and/or mould-release agents that can be used are saturated or to some extent unsaturated fatty and oleic acids and derivatives of these (fatty acid esters, fatty acid salts, fatty alcohols, fatty acid amides). It is moreover possible to use antiozonant waxes (an example of a trademark being Antilux®) as processing aids, the quantities added being small. Quantities used of these agents are from 0 to 10 parts by weight, preferably from 0 to 2 parts by weight, particularly preferably from 0 to 1 part, based on 100 parts by weight of the copolymer of the invention. In order to achieve a further improvement in ease of mould-release, it is moreover possible to use products that can be applied to the mould surface, e.g. products based on low-molecular-weight silicone compounds, products based on fluoropolymers, and also products based on phenolic resins.

An example of a blowing agent that can be used for the production of foamed products is OBSH or ADC.

Reinforcement with reinforcing agents (fibres) made of glass is also possible in accordance with the teaching of U.S. Pat. No. 4,826,721, as also is reinforcement by cords, textiles, or fibres made of aliphatic or aromatic polyamides (Nylon®, Aramid®), polyesters, or by natural-fibre products.

The vulcanizable composition of the invention is preferably produced by using a conventional mixing assembly, e.g. a roll mill or an internal mixer, to mix ethylene copolymers of the invention with the crosslinking agent, optionally one or more co-agents and optionally other chemicals and added substances which are in general use in the rubber industry, e.g. those mentioned above. It is possible here to use either single- or multistage mixing processes.

Two variants of possible implementation of the invention are presented below by way of example:

Process A: Production in an Internal Mixer

The process begins by charging the ethylene copolymers of the invention to the internal mixer (preferably an internal mixer with what is known as "intermeshing" rotor geometry), and the material is comminuted. After a suitable period of mixing, the filers and additives are added. The mixing takes place with temperature control with the proviso that the material in the mixer remains for a suitable time at a temperature in the range from 80 to 150° C. After another suitable period of mixing the other mixture constituents are added, for example optionally stearic acid, co-agents, antioxidants, plasticizers, white pigments (for example titanium dioxide), dyes and other processing agents. After another suitable period of mixing the internal mixer is aerated and the shaft is purged. After another suitable period the cross-linking agent is added. It is necessary here to control the temperature of the mixture carefully in order to prevent incipient vulcanization in the mixer. The rotation rate of the rotor must if necessary be reduced in order to reduce the temperature of the mixture. After another suitable period the material is discharged from the internal mixer to give the vulcanizable mixture. The expression "suitable periods" means a number of seconds to a number of minutes. The resultant vulcanizable mixtures can be assessed conventionally, for example via Mooney viscosity, via Mooney scorch or via a rheometer test. Alternatively it is possible to discharge the mixture without addition of the crosslinking agent and to incorporate the crosslinking agent on a roll mill.

Process B: Production on the Roll

The addition sequence can be analogous to that for the above process A. The ethylene copolymers of the invention and the vulcanizable compositions comprising these are typically vulcanized at a temperature in the range from 100 to 250° C., preferably from 140 to 220° C., particularly preferably from 160 to 200° C. Vulcanization can if necessary be followed by conditioning at a temperature of about 150 to 200° C. for from 1 to 24 hours in order to improve the properties of the final product.

The invention also provides vulcanizates obtainable via vulcanization of the ethylene copolymers of the invention or of mixtures comprising these. These vulcanizates exhibit very good values in the compression set test at room temperature and 150° C., high tensile stress values and good elongation at break values, and also a very good combination of low oil-swelling factor and low glass transition temperature.

The ethylene copolymers of the invention and vulcanizable mixtures and/or vulcanizates produced therefrom can be used for the production of unfoamed or foamed mouldings, and also for the production of foils and coverings of any type, in particular for the production of cable conduction layers, cable sheathing, gaskets, transport belts, bellows, hoses, cylinder-head-cover gaskets and O-rings. The vulcanizates of the invention can moreover be mixed into plastics, where they serve as non-volatile antistatic agent. The invention therefore further provides the use of the ethylene copolymers of the invention for providing antistatic properties to polymers.

The ethylene copolymers of the invention can moreover be used as elastomeric phase in thermoplastic vulcanizates, and also as blend component in plastics or rubbers, preferably PVC, polyamide, polyester and/or HNBR.

Other possible uses consist in the use of ethylene copolymers of the invention as non-volatile plasticizers and/or impact modifiers in plastics, preferably PVC, polyamide and/or polyester.

A substantial advantage of the invention is that, in comparison with conventional products with identical vinyl ester content, the vulcanizates of the invention have lower glass transition temperature for identical oil resistance. Surprisingly, moreover there is no increase in water-swelling factor in comparison with standard EVM with use of carbon black as filler.

EXAMPLES

Test Methods:

Glass transition temperature (Tg) is determined by means of differential scanning calorimetry—DSC—in accordance with EN ISO 11357-1:2009 and EN ISO 11357-2:2014, using helium as inert gas and determining glass transition temperature by the inflection point method. The temperature scanning rate is 20 K/min for the copolymers and 10 K/min for the vulcanizates.

The composition of the copolymers was determined by means of $^1$H NMR (Bruker DPX400 with XWIN-NMR 3.1 software, measurement frequency 400 MHz).

Gel permeation chromatography (GPC) was carried out in accordance with DIN 55672-1, Gel permeation chromatography (GPC) Part 1: Tetrahydrofuran (THF) as eluent, with addition of 0.5% by weight of triethylamine. Polystyrene was used as standard.

Mooney viscosity (ML (1+4)100° C.) values are in each case determined by using a shearing disc viscometer in accordance with ISO 289 at 100° C.

The sheets for determination of mechanical properties were vulcanized in a vulcanization press from Werner & Pfleiderer between Teflon films under the stated conditions.

Shore A hardness was measured in accordance with ASTM D2240-81.

The tensile tests to determine stress as a function of deformation were carried out in accordance with DIN 53504 or ASTM D412-80.

Hot-air ageing was carried out in accordance with DIN 53508/2000. The method used was 4.1.1 "Ageing in oven with forced air circulation".

Storage in oil and in water was carried out in accordance with DIN ISO 1817.

Substances with Trade Names:

| | |
|---|---|
| Perkadox ® 16 | Di(4-tert-butylcyclohexyl) peroxydicarbonate from AkzoNobel Functional Chemicals |
| VAZO52 ® | 2,2'-Azobis(2,4-dimethylvaleronitrile) from E.I. du Pont de Nemours and Company |
| Levapren ® 500 | Ethylene-vinyl acetate copolymer (VA content 50%, ethylene content 50%) from Lanxess Deutschland GmbH |
| Levapren ® 600 | Ethylene-vinyl acetate copolymer (VA content 60%, ethylene content 40%) from Lanxess Deutschland GmbH |
| Levapren ® 700 | Ethylene-vinyl acetate copolymer (VA content 70%, ethylene content 30%) from Lanxess Deutschland GmbH |
| SR550 | Methoxy polyethylene glycol methacrylate ($M_w$ of PEG unit 350) from Sartomer Europe |
| SR552 | Methoxy polyethylene glycol methacrylate ($M_w$ of PEG unit 550) from Sartomer Europe |
| Bisomer ® PPA6 | Hydroxy-terminated polypropylene glycol monoacrylate from GEO Specialty Chemicals, Inc |
| Ethyltriglycol methacrylate | Commercially available product from Evonik Röhm GmbH >97% |
| Methoxy ethyl methacrylate | Commercially available product from TCI Deutschland GmbH |
| Rhenopren ® EPS | White factice (sulphur- and chorine-free crosslinked vegetable oils) from Rheinchemie Rheinau GmbH |

-continued

| | |
|---|---|
| Antilux ® 110 | Paraffin wax from Rheinchemie Rheinau GmbH |
| Rhenofit ® TAC/S | Triallyl cyanurate 70% on 30% silica from Rheinchemie Rheinau GmbH |
| Rhenofit ® DDA | Ageing retarder (diphenylamine derivative) from Rheinchemie Rheinau GmbH |
| Perkadox ® 14-40 B-PD | Supported di(tert-butylperoxyisopropyl)benzene from AkzoNobel N.V. |
| Corax ® N550/30 | Carbon black from Orion Engineered Carbons GmbH |
| Stabaxol ® P | Polycarbodiimide from Rhein Chemie Rheinau GmbH |
| Maglite ® DE | Magnesium oxide from The HallStar Company |

Production of Ethylene Copolymers

Inventive Example 1 (without Further Addition)

The polymer was produced in a 5 L stirred autoclave. To this end 2335 g of a solution composed of 760 g of tert-butanol, 1390 g of vinyl acetate (VA), 185 g of SR 550 and 253.95 g of an activator solution composed of 3.95 g of Perkadox 16 and 250 g of vinyl acetate-tertbutanol solution (20% strength of vinyl acetate) were introduced in succession at RT into the 5 L reactor. The reactor was flushed with nitrogen five times, and then 890 g of ethylene were introduced under pressure. The temperature was increased to 54° C., the resultant pressure being about 380 bar. During the polymerization, the pressure was held constant at 380 bar±10 bar by alternate introduction of ethylene under pressure and of a tert-butanol/vinyl acetate solution (60% strength of vinyl acetate) in the ratio 2:1.

After a reaction time of 10 h, the addition was terminated, and the polymer solution was slowly forced out of the 5 L reactor into a termination autoclave. Removal of the solvent and of the residual monomers gave 1528 g of an SR550-ethylene-vinyl acetate copolymer.

Comparative Example 1 (without Further Addition)

The polymer was produced in a 5 L stirred autoclave. To this end 2267 g of a solution composed of 730 g of tert-butanol, 1345 g of vinyl acetate (VA), 192 g of methoxyethyl methacrylate and 253.95 g of an activator solution composed of 3.95 g of Perkadox 16 and 250 g of vinyl acetate-tert-butanol solution (20% strength of vinyl acetate) were introduced in succession at RT into the 5 L reactor. The reactor was flushed with nitrogen five times, and then 940 g of ethylene were introduced under pressure. The temperature was increased to 54° C., the resultant pressure being about 380 bar. During the polymerization, the pressure was held constant at 380 bar±10 bar by alternate introduction of ethylene under pressure and of a tert-butanol/vinyl acetate solution (60% strength of vinyl acetate) in the ratio 2:1.

After a reaction time of 10 h, the addition was terminated, and the polymer solution was slowly forced out of the 5 L reactor into a termination autoclave. Removal of the solvent and of the residual monomers gave 1234 g of a methoxyethyl methacrylate-ethylene-vinyl acetate copolymer.

Ethylene=30.4% by weight, VA=54.3% by weight, methoxyethyl methacrylate=15.3% by weight
ML(1+4) 100° C.=−20° C.,
$Tg_1$=−20° C., $Tg_2$: +2° C.

Inventive Examples 2 to 9, Comparative Example 2 (with Further Addition)

The polymers were produced in a 5 L stirred autoclave. To this end, the quantities stated in the "initial charge" column in Table 1 of tert-butanol, vinyl acetate (VA) and SR 550, and also the appropriate initiator, were used as initial charge. The reactor was flushed five times with nitrogen for inertization and depressurized, and then the quantity of ethylene stated in the "ethylene" column in Table 1 was introduced under pressure. The reaction solution was then brought to the temperature stated in the "temperature" column, the resultant pressure being about 380 bar. After half an hour, metering of the mixture listed in the "feed" column, composed of tert-butanol, vinyl acetate and SR 550, into the reaction mixture was begun, continuing for a period of 8.5 h. During the entire reaction time, the pressure was held at 380±10 bar by introducing ethylene under pressure.

After a reaction time of 10 h, the ethylene addition was terminated, and the polymer solution was slowly forced out of the 5 L reactor into a termination autoclave. Removal of the solvent and of the residual monomers gave an SR 550-ethylene-vinyl acetate copolymer. Table 2 shows the analytical data.

TABLE 1

Polymerization parameters for the production of ethylene copolymers.

| Example | Initial charge | Ethylene [g] | Initiator | Temp. [° C.] | Addition after start of reaction | Addition rate [g/min] | Yield [g] |
|---|---|---|---|---|---|---|---|
| 2 | 893 g tert-butanol<br>1338 g vinyl acetate<br>6 g SR550 | 1062 | 3.0 g VAZO 52 ® | 61 | 122.2 g tert-butanol<br>83.8 g vinyl acetate<br>83.8 g SR 550 | 0.6 | 1439 |
| 3 | 893 g tert-butanol<br>1147 g vinyl acetate<br>12 g SR550 | 1152 | 3.0 g VAZO 52 ® | 61 | 125.3 g tert-butanol<br>188.0 g SR 550 | 0.62 | 1114 |
| 4 | 893 g tert-butanol<br>1250 g vinyl acetate<br>9 g SR550 | 1130 | 3.0 g VAZO 52 ® | 61 | 122.2 g tert-butanol<br>32.8 g vinyl acetate<br>151 g SR 550 | 0.6 | 1257 |
| 5 | 960 g tert-butanol<br>1440 g vinyl acetate<br>11 g SR550 | 960 | 3.95 g Perkadox 16 ® | 54 | 122.2 g tert-butanol<br>4.8 g vinyl acetate<br>179 g SR 550 | 0.6 | 1537 |
| 6 | 906 g tert-butanol<br>1683 g vinyl acetate<br>12 g SR550 | 905 | 3.95 g Perkadox 16 ® | 54 | 148.6 g tert-butanol<br>78.0 g vinyl acetate<br>198 g SR 550 | 0.83 | 1660 |
| 7 | 804 g tert-butanol<br>1205 g vinyl acetate<br>9.5 g SR552 | 905 | 2.5 g VAZO 52 ® | 61 | 122.2 g tert-butanol<br>23.3 g vinyl acetate<br>160.5 g SR 552 | 0.6 | 1301 |

TABLE 1-continued

Polymerization parameters for the production of ethylene copolymers.

| Example | Initial charge | Ethylene [g] | Initiator | Temp. [° C.] | Addition after start of reaction | Addition rate [g/min] | Yield [g] |
|---|---|---|---|---|---|---|---|
| 8 | 960 g tert-butanol<br>1420 g vinyl acetate<br>11.0 g ethyl triglycol methacrylate | 990 | 3.95 g Perkadox 16 ® | 54 | 183.6 g tert-butanol<br>94.6 g vinyl acetate<br>179.0 g ethyl triglycol methacrylate | 0.9 | 1648 |
| 9 | 893 g tert-butanol<br>1338 g vinyl acetate<br>9 g Bisomer ®PPA6 | 1062 | 3.00 g VAZO 52 ® | 61 | 81 g tert-butanol<br>81 g vinyl acetate<br>151 g Bisomer ®PPA6 | 0.76 | 1677 |
| Comp. 2 | 980 g tert-butanol<br>1420 g vinyl acetate<br>11.0 g methoxyethyl methacrylate | 990 | 3.95 g Perkadox 16 ® | 54 | 183.6 g tert-butanol<br>96.4 g vinyl acetate<br>179 g methoxyethyl methacrylate | 0.9 | 1084 |

TABLE 2

Analytical data.

| | GPC | | | | Composition | | | ML(1 + 4) |
|---|---|---|---|---|---|---|---|---|
| Example | Mn [kg/mol] | Mw [kg/mol] | Mz [kg/mol] | Tg [° C.] | Ethylene [% by wt.] | Vinyl acetate [% by wt.] | Monomer of general formula (I) [% by wt.] | 100° C. [MU] |
| Comp. 1 | 62 | 178 | 376 | −20/+2 | 30.4 | 54.3 | 15.3 Methoxyethyl methacrylate | 20 |
| 1 | 68 | 360 | 1071 | −22 | 31.4 | 57.2 | 11.4 SR 550 | 15 |
| 2 | 60 | 197 | 446 | −30 | 40.5 | 53.1 | 7.3 SR 550 | 14 |
| 3 | 58 | 167 | 353 | −36 | 39.1 | 43.6 | 17.3 SR 550 | <10 |
| 4 | 61 | 182 | 397 | −32 | 39.4 | 47.9 | 12.8 SR 550 | 10 |
| 5 | 65 | 239 | 583 | −31 | 35.3 | 52.5 | 12.2 SR 550 | 16 |
| 6 | 64 | 216 | 513 | −25 | 29.8 | 57.9 | 12.3 SR 550 | 11 |
| 7 | 64 | 193 | 414 | −35 | 41.5 | 45.5 | 13.0 SR 552 | 19 |
| 8 | 68 | 272 | 728 | −27 | 34.2 | 54.6 | 11.2 Ethyl triglycol methacrylate | 20 |
| 9 | 71 | 249 | 600 | −29 | 39.6 | 51.5 | 8.9 Bisomer ®PPA6 | 25 |
| Comp. 2 | 62 | 178 | 416 | −18 | 31.0 | 55.0 | 14.0 Methoxyethyl methacrylate | 19 |

The polymer of inventive Example 5 has a significantly lower glass transition temperature than an ethylene-vinyl acetate copolymer which has the same ethylene content and which comprises no monomers of the formula (I). By way of example, Levapren 700, an ethylene-vinyl acetate copolymer with ethylene content 30% by weight has a glass transition temperature of −15° C. Comparative Examples 1 and 2 show that methacrylate monomers having only a single alkylated ethylene glycol unit are not adequate to achieve a significant reduction of glass transition temperature. Methacrylate monomers of that type actually give an inhomogeneous product for which, as shown by Comparative Example Comp. 1, DSC reveals two glass transition temperatures, and mechanical properties are generally poorer than those of homogeneous products.

Addition of monomers of the general formula (I) after reaction has begun can achieve a still lower glass transition temperature, as revealed by a comparison of the glass transition temperatures of the polymers of Examples 6+1. Although this type of procedure can also suppress formation of inhomogeneity in the case of methacrylate monomers that have only a single alkylated ethylene glycol unit, glass transition temperature is significantly higher than with use of the monomers of the formula (I) of the invention.

Production of the Vulcanizable Mixtures and Vulcanizates

The polymers were produced according to the formulations shown in Table 3 in a GK 1.5 E internal mixer from Harburg-Freudenberger. The fill level was 70%, the temperature was 30° C., the rotation rate was 40 rpm and the ram pressure was 8 bar.

Polymer, fillers, plasticizers and other constituents except for the peroxide were charged to the mixer, the ram was lowered, the mixture was mixed for 3 minutes, then the ram was aerated and swept, the ram was again lowered and the mixture was discharged when its temperature reached 110° C. The Perkadox® 14-40 B-PD was then incorporated into the mixture on the roll at 30° C.

The mixture was vulcanized in the press at 180° C. (10 min for sheets/test samples of thickness 2 mm, 12 min for sheets/test samples of thickness 6 mm).

As can be seen from Table 4, the vulcanizates with comparable oil-swelling factor produced from polymers of the invention have significantly reduced glass transition temperatures. The water-swelling factor is moreover comparable with, or actually somewhat smaller than, that of the vulcanizates produced from the comparative polymers.

TABLE 3

Formulations for the mixing experiments, quantitative data in phr

| | Example No. | | | | | |
|---|---|---|---|---|---|---|
| | Comp. M1 | Comp. M2 | Comp. M3 | M1 | M2 | M3 |
| Levapren 500 | 100 | | | | | |
| Levapren 600 | | 100 | | | | |
| Levapren 700 | | | 100 | | | |
| Copolymer from Inv. Ex. 3 | | | | 100 | | |
| Copolymer from Inv. Ex. 4 | | | | | 100 | |

TABLE 3-continued

Formulations for the mixing experiments, quantitative data in phr

| | Comp. M1 | Comp. M2 | Comp. M3 | M1 | M2 | M3 |
|---|---|---|---|---|---|---|
| Copolymer from Inv. Ex. 6 | | | | | | 100 |
| Corax ® N 550/30 | 45 | 45 | 45 | 45 | 45 | 45 |
| Maglite ® DE | 3 | 3 | 3 | 3 | 3 | 3 |
| Rhenopren ® EPS | 2 | 2 | 2 | 2 | 2 | 2 |
| Antilux ® 110 | 1 | 1 | 1 | 1 | 1 | 1 |
| Stabaxol ® P | 2 | 2 | 2 | 2 | 2 | 2 |
| Rhenofit ® DDA | 1 | 1 | 1 | 1 | 1 | 1 |
| Rhenofit ® TAC/S | 2 | 2 | 2 | 2 | 2 | 2 |
| Perkadox ® 14-40B-PD | 6 | 6 | 6 | 6 | 8 | 6 |
| Total | 162 | 162 | 162 | 162 | 164 | 162 |

TABLE 4

Results of the mixing experiments

| | | Comp. M1 | Comp. M2 | Comp. M3 | M1 | M2 | M3 |
|---|---|---|---|---|---|---|---|
| Ethylene content in copolymer | % by wt. | 50 | 40 | 30 | 39.1 | 39.4 | 29.8 |
| ML(1 + 4)100° C. | MU | 44 | 45 | 44 | 19 | 23 | 27 |
| Vulcanization in the press at 180° C. | | | | | | | |
| Hardness | ShA | 72 | 71 | 70 | 68 | 69 | 67 |
| Elongation at break | % | 201 | 203 | 195 | 202 | 176 | 220 |
| Tg (DSC) | ° C. | −28 | −25 | −14 | −35 | −34 | −25 |
| Storage 70 h/150° C. IRM 903 | | | | | | | |
| Change of mass | % | 64 | 43 | 25 | 48 | 42 | 25 |
| Change of volume | % | 82 | 56 | 33 | 64 | 55 | 33 |
| Hardness | ShA | 53 | 53 | 56 | 47 | 53 | 51 |
| Elongation at break | % | 97 | 123 | 159 | 120 | 125 | 187 |
| Storage 168 h/80° C. deionized water | | | | | | | |
| Change of mass | % | 6 | 8 | 10 | 6 | 4 | 10 |
| Change of volume | % | 7 | 8 | 11 | 6 | 4 | 10 |
| Hardness | ShA | 70 | 89 | 68 | 67 | 69 | 63 |
| Elongation at break | % | 205 | 194 | 187 | 218 | 195 | 230 |

What is claimed is:

1. Ethylene copolymers comprising:
   i) 10 to 69% by weight of copolymerized ethylene,
   ii) 30 to 84% by weight of copolymerized units of at least one vinyl ester of an alkyl carboxylic acid, and
   iii) 1 to 50% by weight of repeating units derived from at least one monomer of the general formula (I)

$$CH_2=C(R^1)(COO(R^2O)_n R^3) \quad (I)$$

in which
   $R^1$ is hydrogen or methyl,
   $R^2$ is respectively mutually independently a linear or branched $C_2$ to $C_6$-alkylene group,
   $R^3$ is hydrogen, unsubstituted phenyl or phenyl having one or more $C_1$-$C_3$ alkyl substituents, a linear or branched $C_1$-$C_8$ alkyl group or —C(=O)$R^4$,
   $R^4$ is hydrogen or a linear or branched $C_1$-$C_8$ alkyl group, and
   n is a number from 2 to 30,
   where the quantities are based on the entirety of the monomers i) to iii).

2. The ethylene copolymers according to claim 1, where the vinyl esters of an alkyl carboxylic acid derived from an alkyl carboxylic acid group having from 2 to 13 C atoms and also from a vinyl alcohol group having from 2 to 5 C atoms.

3. The ethylene copolymers according to claim 1, comprising from 2 to 40% by weight.

4. The ethylene copolymers according to claim 1, where the moieties $R^2$ are selected mutually independently from the group comprising ethane-1,2-diyl, propane-1,3-diyl, propane-1,2-diyl, butane-1,4-diyl, butane-1,3-diyl, pentane-1,3-diyl, pentane-1,4-diyl, pentane-1,5-diyl, and 2-methylbutane-1,4-diyl.

5. The ethylene copolymers according to claim 1, where the moieties $R^3$ are selected from the group consisting of H, $CH_3$, $CH_2CH_3$, $CH_2CH_2CH_3$, $CH_2CH_2CH_2CH_3$, CHO, $COCH_3$, $COCH_2CH_3$, $COCH_2CH_2CH_3$ and $COCH_2CH_2CH_2CH_3$.

6. The ethylene copolymers according to claim 1, wherein the copolymers comprise a total quantity of less than 25% by weight of one or more other copolymerized monomers (iv).

7. The ethylene copolymers according to claim 6, wherein the other monomers (iv) are selected from $C_1$-$C_8$-alkyl acrylates, $C_1$-$C_8$-alkyl methacrylates, acrylates containing epoxy groups, methacrylates containing epoxy groups, vinyl ketones, vinylaromatic compounds, conjugated dienes, α-monoolefins, vinyl monomers having a hydroxy group, chlorovinyl acetate, vinylidene fluoride, hexafluoropropene, vinylidene chloride, tetrafluoroethylene, tetrachloroethylene, vinyl chloride, unsaturated amide monomers and carbon monoxide.

8. A process for the production of the ethylene copolymers according to claim 1, the process comprising subjecting ethylene, the vinyl esters of an alkyl carboxylic acid, the monomers of the general formula (I), and optionally one or more other monomers (iv) to free-radical polymerization.

9. The process according to claim 8, wherein, after the polymerization reaction has been initiated, the monomers of the general formula (I) are added.

10. The process according to claim 8, wherein, after the polymerization reaction has been initiated, the monomers of the general formula (I) are added in the form of a mixture with the vinyl ester and/or with a solvent.

11. Vulcanizable mixtures comprising the ethylene copolymers according to claim 1.

12. A process for the production of vulcanizates made of vulcanizable mixtures according to claim 11, the process comprising crosslinking the ethylene copolymers by means of diamines, polyacids, anhydrides of a polyacid, compounds comprising peroxide groups and/or high-energy radiation.

13. Vulcanizates obtained from the vulcanizable mixtures according to claim 11.

14. Articles of manufacture comprising the vulcanizable mixtures according to claim 11, wherein the articles of manufacture comprise unfoamed or foamed mouldings, cable conduction layers, cable sheathing, gaskets, transport belts, bellows, hoses, cylinder-head-cover gaskets and O-rings.

15. Plastics or rubbers comprising the ethylene copolymers according to claim 1 as a blend component.

16. Non-volatile plasticizer and/or impact modifier for plastics comprising the ethylene copolymers according to claim 1.

17. The ethylene copolymers according to claim 1, wherein the copolymers comprise:
  15 to 59% by weight, of the copolymerized ethylene,
  2 to 40% by weight of repeating units derived from the monomers of the general formula (I), and
  35 to 80% by weight, of the copolymerized units of the at least one vinyl ester of an alkyl carboxylic acid
  wherein the amounts are each based on the entirety of the monomers i) to iii).

18. The ethylene copolymers according to claim 17, wherein the copolymers comprise 6 to 20% by weight, of repeating units derived from monomers of the general formula (I), based on the entirety of the monomers i) to iii).

* * * * *